US008375552B2

(12) United States Patent
Normoyle et al.

(10) Patent No.: US 8,375,552 B2
(45) Date of Patent: Feb. 19, 2013

(54) METHOD OF MANUFACTURING A CRIMPED ASSEMBLY, AND RELATED APPARATUSES

(75) Inventors: Brendan Normoyle, Castlemahon (IE); Padraic Curran, Ennis (IE)

(73) Assignee: Tyco Electronics Raychem Ireland, Shannon, Co. Clare (IE)

( * ) Notice: Subject to any disclaimer, the term of this patent is extended or adjusted under 35 U.S.C. 154(b) by 1310 days.

(21) Appl. No.: 11/571,200

(22) PCT Filed: Jun. 3, 2005

(86) PCT No.: PCT/GB2005/002198

§ 371 (c)(1),
(2), (4) Date: Dec. 22, 2006

(87) PCT Pub. No.: WO2006/000743

PCT Pub. Date: Jan. 5, 2006

(65) Prior Publication Data

US 2009/0042457 A1 Feb. 12, 2009

(30) Foreign Application Priority Data

Jun. 24, 2004 (GB) .................................. 0414131.3

(51) Int. Cl.
*B23P 11/00* (2006.01)

(52) U.S. Cl. ................ 29/509; 29/505; 29/508; 29/515; 29/517

(58) Field of Classification Search .................... 29/505, 29/508, 515, 516, 517
See application file for complete search history.

(56) References Cited

U.S. PATENT DOCUMENTS

| | | | | | |
|---|---|---|---|---|---|
| 663,490 | A | * | 12/1900 | Cleveland | 29/517 |
| 2,226,849 | A | | 12/1940 | Douglas | |
| 2,327,683 | A | * | 8/1943 | Warner et al. | 403/391 |
| 2,889,603 | A | | 6/1959 | Joy et al. | |
| 2,965,147 | A | | 12/1960 | Hoffman | |
| 3,192,622 | A | * | 7/1965 | Bannerman | 29/517 |
| 4,656,720 | A | | 4/1987 | Dumora | |
| 5,680,289 | A | | 10/1997 | Robinson et al. | |

FOREIGN PATENT DOCUMENTS

WO WO 01/15292 A 3/2001

* cited by examiner

*Primary Examiner* — Derris Banks
*Assistant Examiner* — Azm Parvez
(74) *Attorney, Agent, or Firm* — Barley Snyder

(57) ABSTRACT

A method of crimping a load-bearing member and an end fitting together such that the load-bearing member lies displaced from a center of a cross-section of the end fitting. The method includes the steps of inserting the load-bearing member into an aperture in the end fitting and advancing at least one deformation tool relative to the end fitting to deform the wall of the aperture into gripping engagement with the load-bearing member. The extent of the resulting deformation of the wall over a predetermined length thereof varies in dependence on a distance along the length from the load-bearing member.

36 Claims, 11 Drawing Sheets

METHOD OF MANUFACTURING A CRIMPED ASSEMBLY, AND RELATED APPARATUSES

CROSS-REFERENCE TO RELATED APPLICATIONS

This application claims the benefit of the filing dates under 35 U.S.C. §120 of International Patent Application No. PCT/GB2005/002198 filed Jun. 3, 2005 and under 35 U.S.C. §119 (a)-(d) of Great Britain Patent Application No. GB 0414131.3 filed Jun. 24, 2004.

FIELD OF THE INVENTION

This invention relates to a method of manufacturing a crimped assembly and related apparatuses.

BACKGROUND

The process of crimping is widely used in the manufacture of, for example, electrical insulators and surge arresters.

In such technologies it is known to use a process known as "centered crimping" to manufacture electrical insulators.

In one form of this prior art method, an electrically insulating glass fiber rod is pushed into a center of a hollow, cylindrical, metal end-fitting having an open aperture. The aperture defines a clearance that is only slightly larger than a diameter of the glass fiber rod.

A metal wall of the end fitting is then crimped, or pressed under hydraulic pressure, onto the rod using hardened metal dies. The end fitting is as a result strongly bonded to the insulator rod. The bond between the components can withstand high forces, such as the tension and weight of overhead power lines in the span between adjacent structures in an electrical distribution network.

FIG. 1 shows a glass fiber rod 10, a cylindrical metal end fitting 11, and crimping dies 12 of the above-described centered crimping method, in which the dies 12 are moveable radially in directions of the arrows in order to effect deformation of the end fitting 11.

There are however requirements to crimp end fittings onto, for example, insulating rods, in an off-center manner.

Such requirements commonly arise in the manufacture of surge arresters. Surge arresters are used to protect equipment connected to power distribution networks from damage by excessive voltage situations caused by lightning strikes, switching surges, incorrect connections, and other abnormal conditions or malfunctions.

The active element in a surge arrester is a varistor, also referred to as a non-linear resistor because it exhibits a non-linear current-voltage relationship. If the applied voltage is less than a certain voltage (the switching or clamping voltage), the varistor is essentially an insulator and only a small leakage current flows through it. If the applied voltage is greater than the switching voltage, the varistor's resistance drops, allowing an increased current to flow through it. That is, a varistor is highly resistive below its switching voltage and substantially conductive above it. The voltage-current relationship of a varistor is described by the equation:

$$I = \left(\frac{V}{C}\right)^{\alpha}$$

In the equation, I is the current flowing the varistor; V is the voltage across the varistor; C is a constant which is a function of the dimensions, composition, and method of fabrication of the varistor; and $\alpha$ (alpha) is a constant which is a measure of the non-linearity of the varistor. A large $\alpha$, signifying a large degree of non-linearity, is desirable.

The surge arrester is commonly attached to an electrical power system in a parallel configuration, with one terminal of the device connected to a phase conductor of the electrical power system and the other terminal to ground or neutral. At normal system voltages, the surge arrester is resistant to current flow (except for the leakage current). If an over-voltage condition exceeding the switching voltage develops, the surge arrester becomes conductive and shunts the surge energy to a value while "clamping" or limiting the system voltage to a value which can be tolerated, without damage, by the equipment being protected.

The mechanical strength and integrity of the surge arrester can be achieved by assembling the core of the arrester from a single varistor element or a stack of varistor elements held between two end terminals by a plurality of elongate strength members disposed therearound. The ends of the strength members are inserted into recesses in the end terminals. Crimping of the end terminals distorts the recesses sufficiently to hold the strength members firmly therewithin (as disclosed in U.S. Pat. No. 5,680,289).

FIG. 2 is an exploded view showing the components of one type of surge arrester S.

In FIG. 2, the components of the surge arrester S when assembled together comprise four elongate glass reinforced polymer rods R that are at each end received in respective apertures located adjacent the corners of respective, essentially square end fittings F.

The end fittings F are crimped onto the rods R.

In the space between the end fittings F lies a series of cylindrical elements defining a varistor V of the aforementioned type. The assembly process for the surge arrester S is such that the rods R are under tension after crimping, which occurs while the end fittings F are compressed to press the components of the varistor V together.

This is achieved by way of the arrester S including in its structure one or more springs acting between the fittings F. The springs (which typically are disc springs) tend to lengthen the overall assembly. The rods R resist such lengthening.

Since the elements of the varistor V are contained within a cage defined by the rods R, the surface arrester S as a whole possesses good structural integrity.

However, as described below, excessive crimping during the manufacturing process crushes the glass fiber/matrix of the load-bearing members and greatly diminishes the mechanical performance of the product.

FIG. 3 shows the result of practicing the method of U.S. Pat. No. 5,680,289 on a cylindrical end fitting 16 during manufacture of a surge arrester of similar design to that shown in FIG. 2. In FIG. 3, a circular array of glass fiber rods 10 is inserted into a series of apertures 13 formed in an end face 14 of a cylindrical end fitting 16 that supports a stack of varistor elements 17.

In accordance with the method of U.S. Pat. No. 5,680,289, regions 18 of the exterior of the end fitting 16 are deformed by dies that are similar to the dies 12 of FIG. 1, in order to crimp the end fitting 16 onto the inserted ends of the other protruding rods 10 at each of the apertures 13.

The extent of the deformation in each of the regions 18 is essentially uniform along its length.

The gaps between adjacent dies used for forming the deformed regions 18 result in ridges 19 spacing the regions 18 from one another.

The example of FIG. 3 therefore relates to off-centered crimping, as compared with the centered crimping of FIG. 1. When attempting to use the known crimping apparatuses for off-center crimping, it becomes considerably more difficult, than when using the apparatus in the "centered" configuration of FIG. 1, to achieve a uniform gripping or crimping pressure acting around the circumference of the insulating rods 10 inserted into the apertures 13.

This problem manifests itself as undesirable peaks in the contact pressure acting on the load-bearing member. These can cause the aforesaid crushing of the glass fiber/matrix material of the load-bearing members.

The problem is illustrated schematically in FIG. 4, which shows in enlarged view two conventional dies 12 acting to effect off-center crimping of a rod 10 received in an aperture 13 of an end fitting 11, during manufacture of the FIG. 3 sub-assembly.

As is visible in FIG. 4, each of the dies 12 has a contact face 28. This causes deformation of the metal of the end fitting on advancing of the dies 12 into the end fitting 11.

Since each of the contact faces 28 is of essentially the same shape as the part of the periphery of the end fitting 11 that it engages, the deformation of the end fitting 11 is essentially invariant over the lengths of the periphery contacted by the contact faces 28. This in turn leads to unbalanced contact pressure acting on the rod 10 (as signified by the arrows in FIG. 4), thereby causing the aforesaid problems.

WO-A-01/15292 attempts to solve this problem in the manufacture of a surge arrester, by crimping onto the ends of the load-bearing members 10 respective, frusto-conical bracing cylinders. These may be applied using the center crimping method exemplified by FIG. 1. On assembly of the surge arrester, the bracing cylinders are received in tapered apertures in the end fittings, such that tension in the load-bearing members drives the bracing cylinders into the apertures.

This method of arranging the components of a surge arrester, however, only enjoys mechanical integrity while under tension. The surge arrester could be disassembled when compressed.

Furthermore, the need separately to crimp, at each end of each load-bearing member, a bracing cylinder adds to the complexity and cost of the manufacturing operation.

Other prior art methods of making surge arresters, involving the use of pressure screws to tension the load-bearing members and the forming of loops in the ends of the load-bearing members, are unacceptably complicated. Thus, there is a need for methods and apparatuses that improve the mechanical performance of products such as surge arresters, without compromising in terms of cost or complexity.

SUMMARY

According to a first aspect of the invention there is provided a method of crimping a load-bearing member and an end fitting together in which the load-bearing member lies displaced from a center of a cross-section of the end fitting The method comprises the steps of inserting a load-bearing member into an aperture defined by a wall in the end fitting; advancing at least one deformation tool to deform a perimeter of the end fitting; and deforming the wall of the aperture into gripping engagement with the load-bearing member, the extent of the resulting deformation of the perimeter of the end fitting over a predetermined length thereof varying in dependence on a distance along the length from the load-bearing member.

This method is applicable to various kinds of off-center crimping including but not limited to the steps in the manufacture of surge arresters.

For the avoidance of ambiguity, the term "load-bearing member" is used herein to denote members such as the rods R of FIG. 2, of a surge arrester requiring crimping in order to retain them in the end fittings.

When the surge arrester is assembled (for example, such that the end fittings compress the varistor elements) the rods are under tension (and hence are load-bearing).

However, the invention as claimed herein is not limited to members that are in tension or compression, and it embraces for example members that are subject to no loading caused by external forces. On the contrary, the term "load-bearing member" is used merely for convenience since in the majority of surge arresters the elongate rods will be under tension most of the time.

Also for the avoidance of doubt the term "length" as used herein with reference to the wall of the aperture means a length on the exterior periphery of the end fitting that is contacted by the deformation tool during practicing of the method defined herein as according to the invention. Thus, in the case of a cylindrical fitting the length is measured circumferentially.

However, the variation in the extent of deformation need not depend solely on the distance, around the perimeter (outer periphery) of the end fitting, that is contacted by a deformation tool. On the contrary, other variables such as the shape or profile of the fitting, for example, in the region contacted by the deformation tool, may influence this effect.

The step of causing variation in the extent of deformation in dependence on the length from the load-bearing member advantageously renders more uniform than in the prior art methods the contact pressure acting around the load-bearing member. Thus, the method of the invention increases the average pressure applied via the crimp, without exceeding the crimp threshold at which damage typically starts to occur to the load-bearing member. The resulting increase in the crimp threshold that is usable in the method of the invention allows the creation of a considerably stronger crimp, using an off-center crimping technique than has hitherto been the case.

Conveniently, the deformation tool includes a contact face for contacting the end fitting. The contact face is profiled and/or aligned relative to the end fitting so as to produce the varying deformation.

Preferably, the deformation tool includes a contact face for contacting the load-bearing member. The contact face includes at least one protuberance that protrudes relative to a further portion thereof, whereby to cause the variation in the extent of the resulting deformation.

In another preferred aspect of the method of the invention, the contact face includes at least two protuberances separated from one another by at least one recess.

In yet a further variant of the method of the invention, the wall of the aperture is generally smooth in the region that is contacted by the contact face.

Alternatively, the wall of the aperture includes one or more protuberances in the region that is contacted by the contact face.

Each of the foregoing arrangements advantageously assists in providing for the aforesaid variation in the extent of deformation. In particular, when (as is commonly the case) the first fitting is made of metal, such features of the method allow for metal flow that assists in providing as uniform a gripping force as possible.

Preferably the method of the invention includes the steps of: inserting a plurality of load-bearing members into a corresponding plurality of apertures in the end fitting; defining a corresponding plurality of the walls; and advancing one or more deformation tools to deform the perimeter so that the walls grippingly engage with respective load-bearing members, wherein the extent of the resulting deformation of the perimeter over respective predetermined lengths thereof caused by the respective deformation tools varies in dependence on a distance along the length from the load-bearing member to which it is nearest.

The steps of inserting a plurality of load-members and crimping each of them according to the principle of variation of the extent of deformation with distance from the load-bearing member allows use of the method of the invention in the manufacture of a practical surge arrester. As noted herein, however, in its broadest form the invention is not limited to use of the method in the manufacture of such a device.

Conveniently, in accordance with the method of the invention the deformation tool is a pressing die. However, other forms of deformation tools are possible within the scope of the invention.

Preferably, following insertion into the aperture, the load-bearing member partly protrudes from the end fitting.

This aspect of the method is advantageously suited to the manufacture of surge arresters.

Preferably over the predetermined length, the extent of the deformation caused by deformation tool increases in proportion to the distance from, as appropriate, the load-bearing member or the load-bearing member to which it is nearest.

This precise arrangement of the variation in the extent of deformation has been found to be particularly suitable for tending to equalize the contact pressure peaks when the load-bearing member and the aperture in which it is inserted are each of circular cross-section. However, other patterns of deformation variation may be possible within the scope of the invention.

The method further includes the optional refinement of causing spacing of the deformation caused by the deformation tool from any face of the end fitting into which the load-bearing member is inserted.

The step of ensuring termination of the zone of deformation at a location spaced from the face into which the load-bearing members are inserted is believed advantageously further to increase the crimp threshold at which damage starts to occur to the material of the load-bearing member.

In a preferred embodiment of the method of the invention, the deformation tools advance simultaneously.

In an alternative arrangement, the deformation tools advance sequentially.

Regardless of the precise order in which the deformation tools advance, the method optionally includes the additional step of moving one or more of the deformation tools generally longitudinally relative to a the load-bearing member while causing deformation of the wall.

This step has been found to permit control of the degree of stress induced in the load-bearing members. This is beneficial during the manufacture of a surge arrester.

When used in the manufacture of a surge arrester, the method of the invention advantageously includes the step of crimping a further end fitting to the load-bearing member at its end remote from the end fitting.

Preferably the securing of such a further end fitting may occur through practicing of the method steps of the invention. However, this need not necessarily be so. Moreover, the further end fitting may be either of the same design as the end fitting or may be of a different design, as desired.

In addition to the foregoing, the invention resides in the use of a method as defined herein in the manufacture of a surge arrester.

According to a second aspect of the invention there is provided an assembly comprising a load-bearing member and a an end fitting that are crimped together such that the load-bearing member lies displaced from a center of a cross-section of the end fitting, the load-bearing member being received in an aperture defined by a wall in the end fitting and a perimeter of the end fitting being deformed to cause gripping engagement of the wall with the load-bearing member, the extent of such deformation over a predetermined length thereof varying in dependence on a distance around the perimeter from the load-bearing member.

Such an assembly may be manufactured according to the method of the invention. The assembly exhibits the advantages described herein in relation to the method.

Preferably, the assembly comprises a plurality of load-bearing members and an end fitting that are crimped together such that one or more of the load-bearing members lies displaced from a center of a cross-section of the end fitting, each of the load-bearing members being received in an aperture defined by a wall in the end fitting, a perimeter of the end fitting being deformed into gripping engagement of each of the walls with the load-bearing member received in the aperture defined thereby, the extent of such deformation over a predetermined length thereof varying in dependence on a distance around a perimeter from the load-bearing member.

Even more preferably, the load-bearing member is elongated and protrudes from the end fitting.

Conveniently, over the predetermined length of the perimeter the extent of the deformation caused by the deformation tool increases in proportion to its distance from, as appropriate, the load-bearing member or the said load-bearing member to which it is nearest.

It is also preferable that deformation of the perimeter is spaced from the face of the end fitting into which the load-bearing member is inserted.

Advantageously, the load-bearing member is elongated and includes a further fitting crimped thereto at its end remote from the end fitting.

The foregoing features of the assembly of the invention give rise to analogous advantages to those described in relation to the corresponding method steps defined herein.

Preferably, the transverse cross-section of the end fitting is a regular shape. However, the method of the invention is applicable to a wide range of fitting cross-sections. Consequently, the assembly of the invention may be commensurately diverse.

In particularly preferred embodiments, the transverse cross-section of the end fitting is selected from the list comprising a circle, a rectangle or a regular polygon.

Alternatively, of course, the transverse cross-section of the end fitting may be irregular.

As used herein "transverse cross-section" refers to the cross-section of the end fitting in a vicinity of the regions of deformation. Within the scope of the invention, the assembly may include one or more end fittings of non-constant cross-section and include, for example, flanges or other features typically in regions spaced from the regions of deformation.

In one preferred embodiment of the invention, at least one of the apertures is or includes a blind hole, an open sided slot or a closed-sided slot.

Such an arrangement has advantages since the load-bearing members, that typically are elongated, cylindrical rods, may be inserted into the end fitting from either of two sides.

However, in other embodiments at least one of the apertures perforates the end fitting.

The precise choice of aperture type will be determined in dependence on the design of a product of which the assembly forms part and manufacturing considerations. Combinations of different types of apertures are possible in a single end fitting forming part of an assembly according to the invention.

Regardless of the aperture type chosen, the aperture preferably include a mouth that is generally free of sharp-edged corners.

In other words, the mouth of the aperture advantageously includes a "blended" zone that blends with the end face of the end fitting. This relieves stress concentrations and thereby improves reliability of the crimp.

Preferably, the load-bearing member includes fibers embedded in a matrix so as to define a rod. This is the typical load-bearing member used in the manufacture of a surge arrester.

Conveniently, the fibers include E-glass or ECR-glass. Also conveniently, the material of the matrix includes one or more of a vinyl ester, a polyester, or an epoxy.

The invention further resides in a surge arrester including an assembly as defined herein or manufactured according to a method defined herein.

According to a third aspect of the invention, there is provided apparatus for carrying out a method as defined herein or for manufacturing an assembly or a surge arrester as defined herein, comprising a jig for securing an end fitting; and one or more deformation tools that are advanceable towards the end fitting secured in the jig and having formed therein one or more apertures each defined by a wall and each having inserted therein a load-bearing member, the deformation tool being capable of deforming the perimeter of the end fitting to deform the wall into gripping engagement with the load-bearing member, such that the extent of deformation of a perimeter over a predetermined length thereof varies in dependence on a distance around the perimeter from the load-bearing member or the nearest said load bearing member.

Preferably the apparatus includes a clamp for pressing the load bearing members and the end fitting together, before deformation of the perimeter of the end fitting occurs.

It is also preferable that the deformation tool includes a contact face for contacting the end fitting. The contact face is profiled and/or aligned relative to the end fitting so as to produce the varying deformation.

Conveniently, the deformation tool includes one or more contact faces. Preferably two or more of the contact faces each subtend a respective angle to a fitting secured in the jig.

Apparatus according to the invention advantageously permits the automated or semi-automated manufacture of, for example, surge arresters according to the principles disclosed herein.

The feature of two or more of the contact faces subtending at a different, respective angle to a fitting secured in the jig advantageously permits the provision of a progressively increasing degree of deformation of the fitting with increasing distance, along the fitting perimeter (circumference for a cylindrical fitting), from an associated load bearing member.

Preferably, a plurality of the deformation tools are advanceable simultaneously towards the end fitting secured in the jig. However, in an alternative arrangement a plurality of the deformation tools are sequentially advanceable towards the end fitting secured in the jig.

The apparatus of the invention may optionally include a controller for controlling advancing of the deformation tools.

In particularly preferred embodiments of the apparatus of the invention, the controller is programmable thereby providing a choice between simultaneous and sequential advancing the deformation tools.

The apparatus of the invention may also optionally include more than one controller and/or a controller that permits some but not all of the deformation tools to advance simultaneously.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE EMBODIMENT(S)

Figure 5:
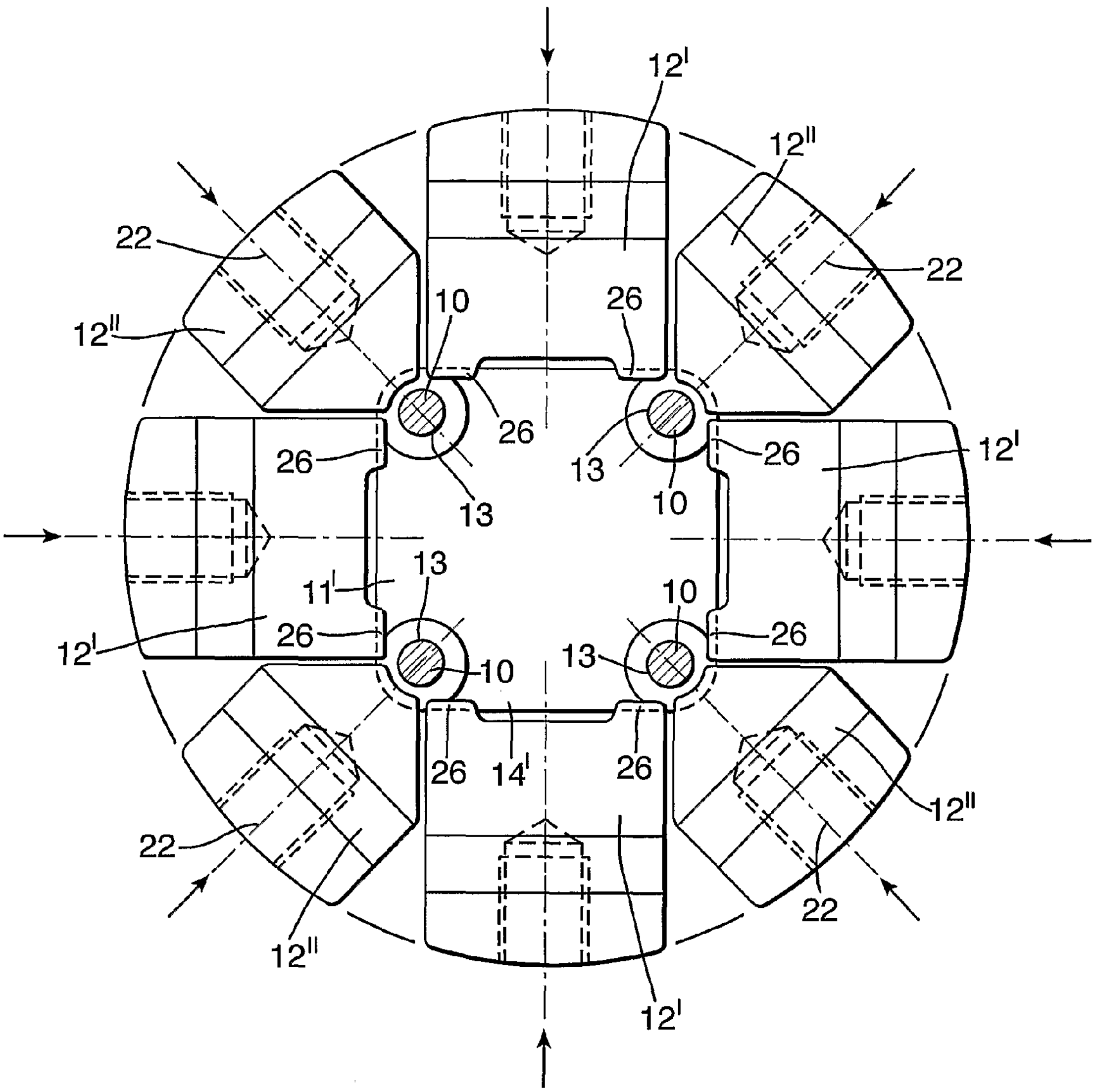
FIG. 5 is a schematic, partly sectioned plan view of an apparatus for carrying out off-center crimping on a square fitting according to a method of the invention.

FIG. 5 shows an arrangement, in accordance with the invention, for carrying out off center crimping. In FIG. 5, a square cross-section end fitting 11' is surrounded by an annular array of deformation tools in the form of side-deforming dies 12' and corner-deforming dies 12", that are moveable in order to crimp cylindrical load-bearing members in the form of surge arrester insulating rods 10. The rods 10 are shown inserted into cylindrical apertures 13 formed at corners of one end face 14' of an end fitting 11'.

The dies 12', 12" are such that on being advanced (for example, under pressure applied by a hydraulic ram) either sequentially or simultaneously into the end fitting 11' in directions signified by the arrows in FIG. 5, the dies 12', 12" cause non-uniform deformation of the material of the end fitting 11' that defines walls of the apertures 13.

In particular, the extent of deformation of the walls of the apertures 13 varies over a certain length of the exterior perimeter of the end fitting 11', as measured from a diagonal mid-point 22 of each of the aperture/rod combinations 10, 13. The diagonal mid-points are denoted by the chain lines in FIG. 5.

In the embodiment shown, the extent of the deformation increases steadily over a short distance along the perimeter to either side of each of the diagonal mid-points 22. This provides for a considerably more even contact pressure of the material of the wall of each of the apertures 13 with each of the respective rods 10 than is possible using prior art crimping techniques. Consequently, there are fewer, and less pronounced, peaks in the crimping forces acting on the rods 10. In turn this means that higher average crimping forces are possible, without exceeding the crimp thresholds of the rods 10.

The gradual increase in the extent of deformation over the peripheral distance to either side of each of the diagonal mid-points 22 is achieved in the FIG. 5 example through the use of particular profiles of the contact faces of the dies 12', 12".

Figure 6:
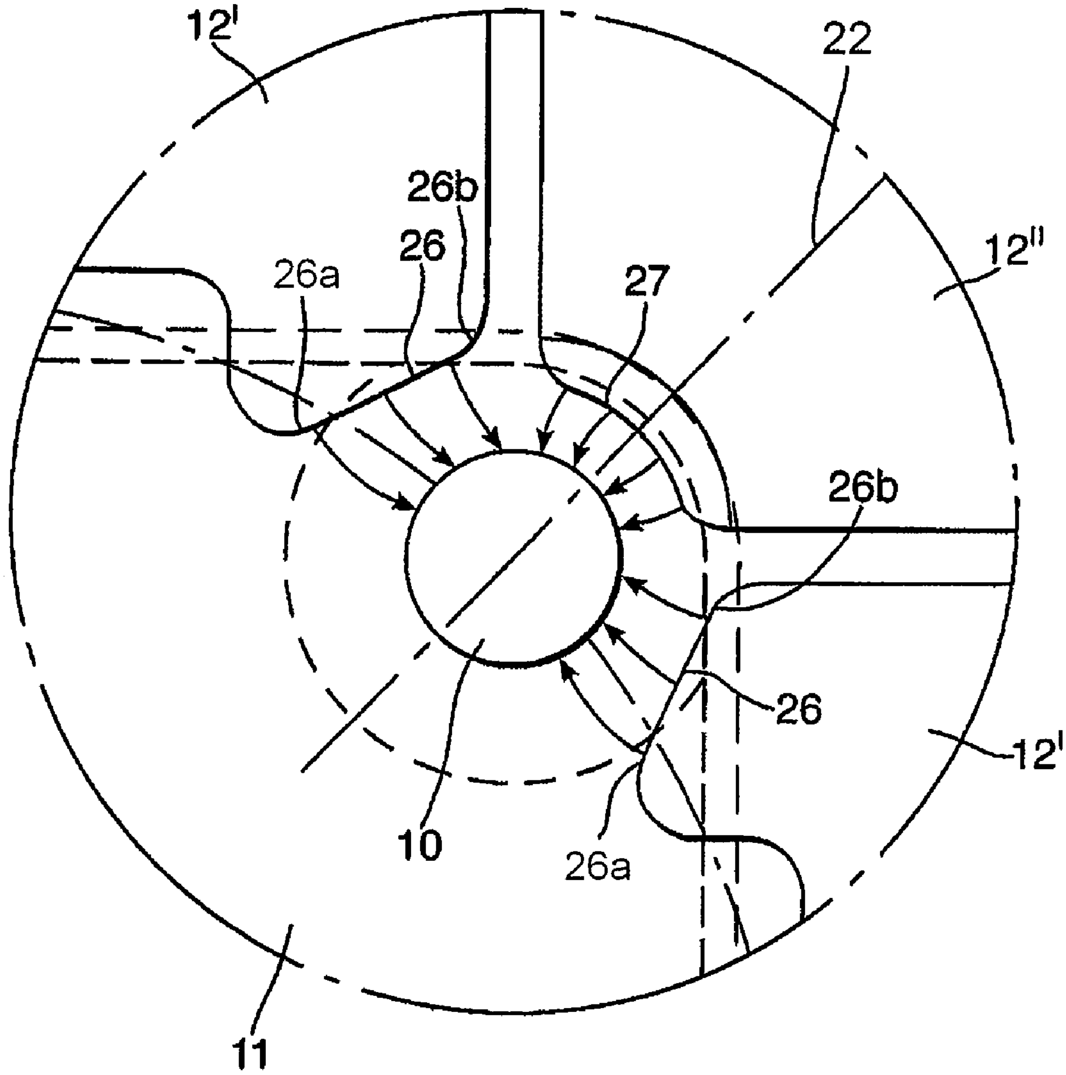
FIG. 6 is an enlargement of part of the FIG. 5 apparatus showing in exaggerated form profiles of the contact faces of the dies.

These profiles are visible in an exaggerated form in FIG. 6. FIG. 6 shows the contact faces of three dies 12', 12" and 12' acting on the wall of one of the apertures 13.

As is evident from FIGS. 5 and 6, each of the dies 12' includes a contact face 26 at each lateral end, whereby each die 12' on advancing acts simultaneously on two of the apertures 13. Each of the dies 12" on the other hand acts on only one of the apertures 13.

The dies 12" each have a contact face 27 that is smoothly arcuate, as shown in FIG. 5. The contact faces 26 of the dies 12', on the other hand, include protruding portions **26*a* and recessed portions 26*b***.

The portions **26*a*, 26*b* are in the embodiment shown interconnected by a flat section of the contact face 26, although in other embodiments the interconnecting section of the contact face 26** could be interrupted, for example, by embossments and/or recesses.

In any event, the effect of having relatively protruding portions **26*a* and relatively recessed portions 26*b* on each of the contact faces 26 is to cause the aforesaid variations in the extent of deformation over a distance along the periphery of the end fitting 11 to either side of each of the diagonal mid-points 22. This is the result of each of the protruding portions 26*a* causing a greater amount of deformation of the metal of the end fitting 10, per increment of advancing movement of the dies 12', than the recessed portions 26*b***.

The resulting deformation variations give rise to crimping forces acting evenly over a major part of the circumference of each of the rods 10, as signified by the arrows in FIG. 6.

Figure 7:
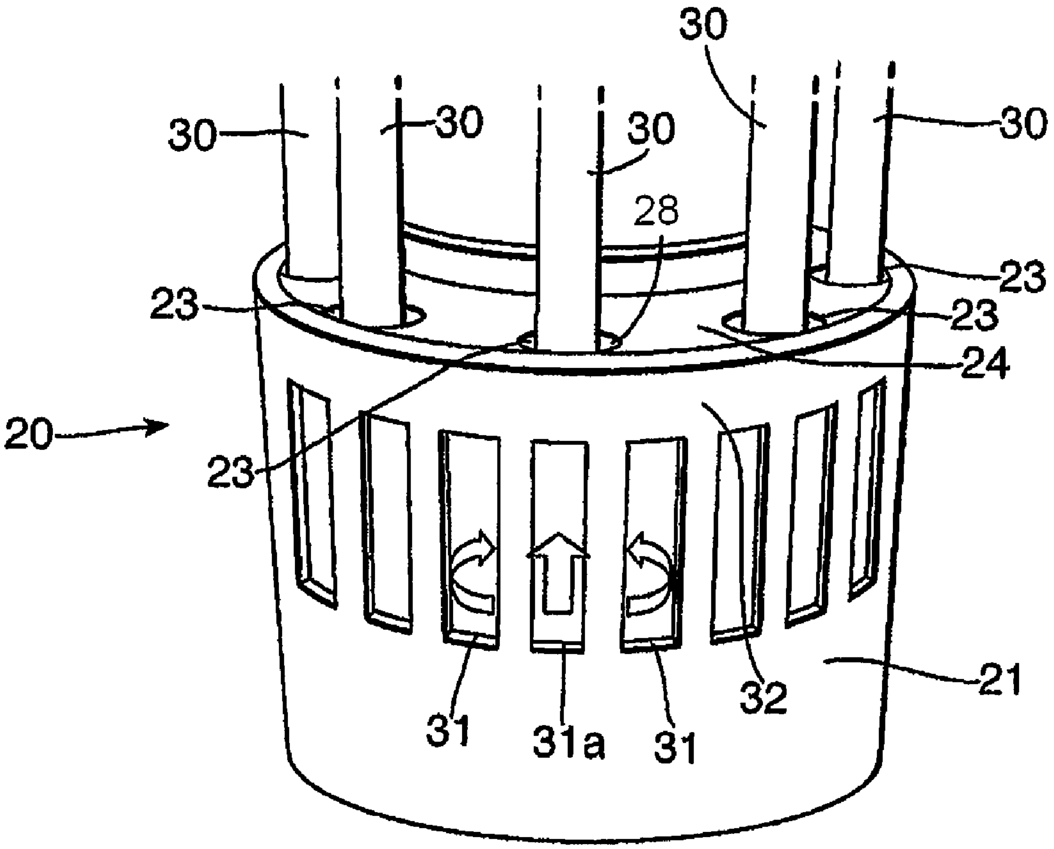
FIG. 7 is a perspective view showing one assembly according to the invention.
Figure 8:
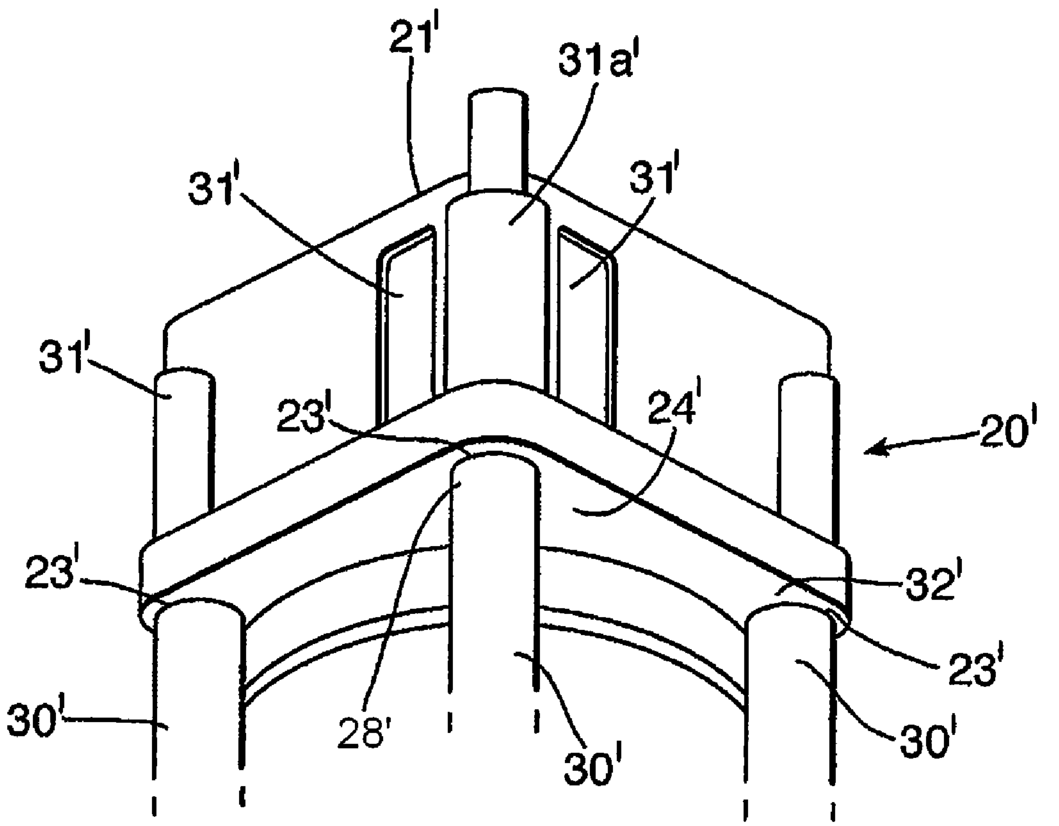
FIG. 8 is a perspective view of a further assembly according to the invention.

FIGS. 7 and 8 each show sub-assemblies 20, 20' manufactured in accordance with the invention. The sub-assembly 21' in FIG. 8 is the result of operation of the FIGS. 5 and 6 apparatus.

In each of FIGS. 7 and 8, a plurality of load-bearing members 30, 30' is received in one of a series of respective apertures 23, 23' formed about the periphery of an end face 24, 24' of a first end fitting 21, 21'.

The walls of the apertures 23, 23' have in the embodiments shown undergone deformation into gripping engagement with the associated load-bearing member (for example, a surge arrester rod) 30, 30' inserted therein.

This results in zones 31, 31' of deformation. The extent of deformation in each of the zones 31, 31' varies over a predetermined length of the exterior of the end fitting 21, 21' extending to either side of the vicinity of the associated load-bearing member 30, 30'.

More particularly, the amount or extent of deformation increases with increasing distance from the vicinity of the load-bearing member 30, 30'.

As signified respectively by numerals **31*a* and 31*a*', in the preferred embodiments of the invention, a central die (for example, the die 12" of FIGS. 5 and 6) causes a central deformation region that is on either side flanked by respective deformation regions 31, 31' caused, for example, by dies such as the dies 12' of FIGS. 5 and 6**.

In the embodiments shown, the central deformation region **31*a*, 31*a*' in each case exhibits essentially uniform deformation. The regions 31, 31'**, on the other hand, exhibit the variations in deformation that are characteristic of the invention.

Since in the embodiments of FIGS. 7 and 8 the load-bearing members 30, 30' are offset from the center of the respective end faces 24, 24', the assemblies of FIGS. 7 and 8 represent the result of an off-center crimping process in accordance with the method defined herein.

In the assemblies of FIGS. 7 and 8, each of the load-bearing members 30, 30' is substantially elongated and protrudes from the end face 24, 24' as appropriate. This is because in the embodiments shown, the assemblies each constitute one end of a respective surge arrester the opposite end of which may at the option of the designer be either similar to those shown, or of a different design. The precise details of the construction of the remainder of the surge arresters shown in FIGS. 7 and 8 will occur readily to the worker of skill in the relevant art.

The respective zones of the deformation regions 31, 31' each terminate a short distance from the end faces 24, 24' of the end fittings 21, 21'. This results in the presence of un-deformed bands 32, 32'. The presence of the un-deformed bands 32, 32' may advantageously increase the crimp threshold at which damage to the load-bearing members 30, 30' may occur when the latter are (as in the preferred embodiments shown) manufactured from glass fiber matrix material.

The transverse cross section of each of the fitting 21, 21' shown in FIGS. 7 and 8 is self-evidently a regular shape. However, irregularly shaped end fitting transverse cross sections are equally possible within the scope of the invention.

The apertures 23, 23' in the preferred embodiments are blind holes. As noted, however, other forms of apertures are possible within the scope of the invention, including but not limited to apertures that perforate the end fitting 21, 21', open sided slots, and/or closed-sided slots.

FIGS. 7 and 8 additionally each show a radiused or "blended" zone 28, 28' at the mouth of each of the apertures 23, 23'. The purpose of such "blending" of the bore of the aperture 23, 23' with the end face 24, 24' of the end fitting 21, 21' is to reduce stress concentrations that may arise during the crimping process.

The precise design of the apertures 23, 23' will occur readily to those of ordinary skill in the relevant art.

Figure 1:
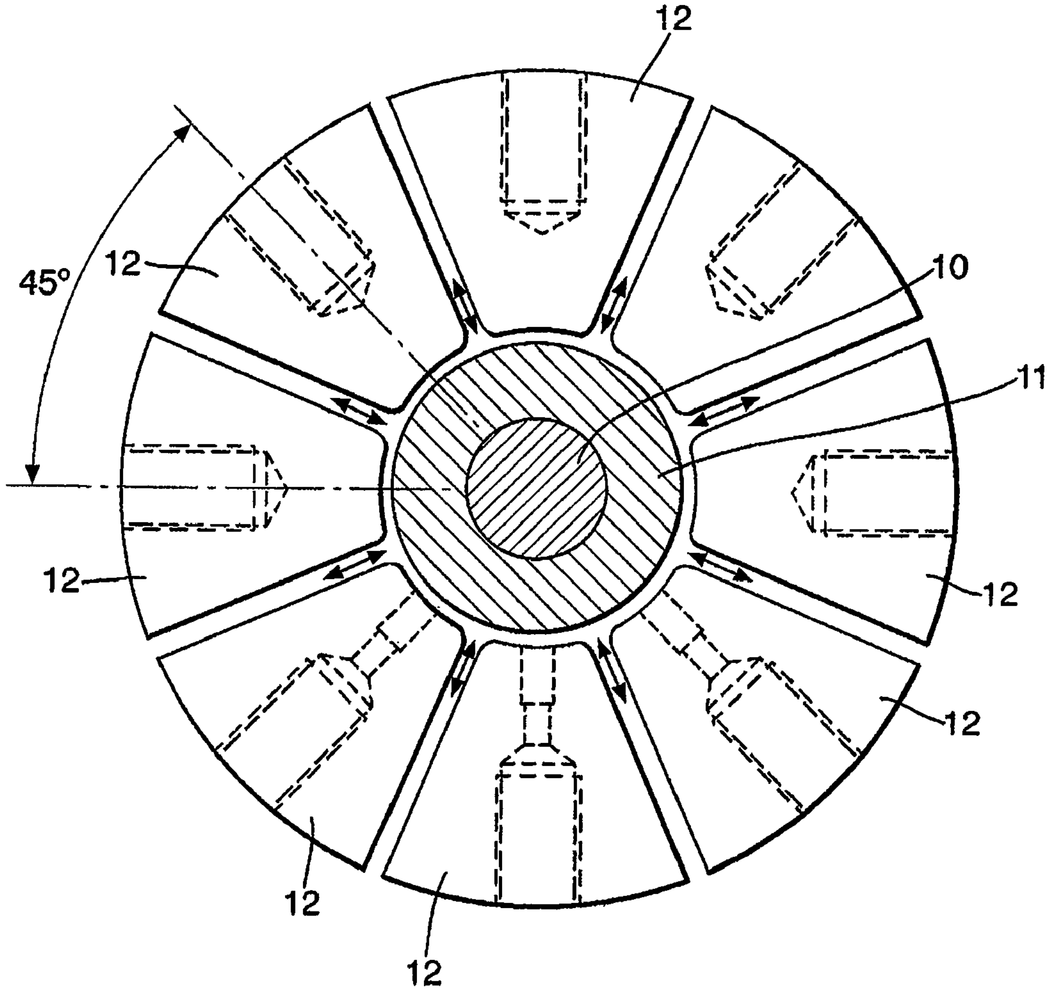
PRIOR ART Fig.1.
FIG. 1 is a schematic, partly sectioned plan view of a prior art apparatus for carrying out centered crimping.
Figure 2:
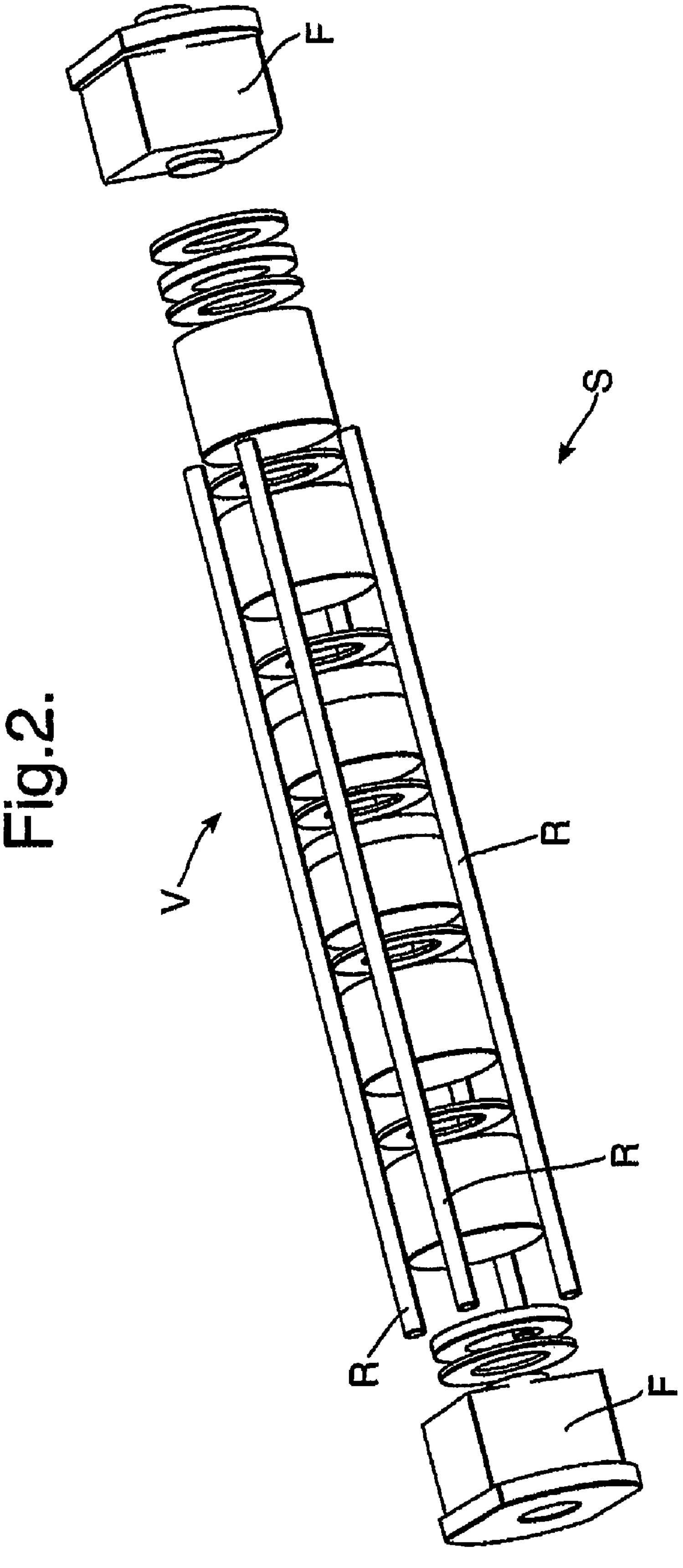
PRIOR ART Fig.2.
FIG. 2 is an exploded view of a prior art design of a surge arrester.
Figure 3:
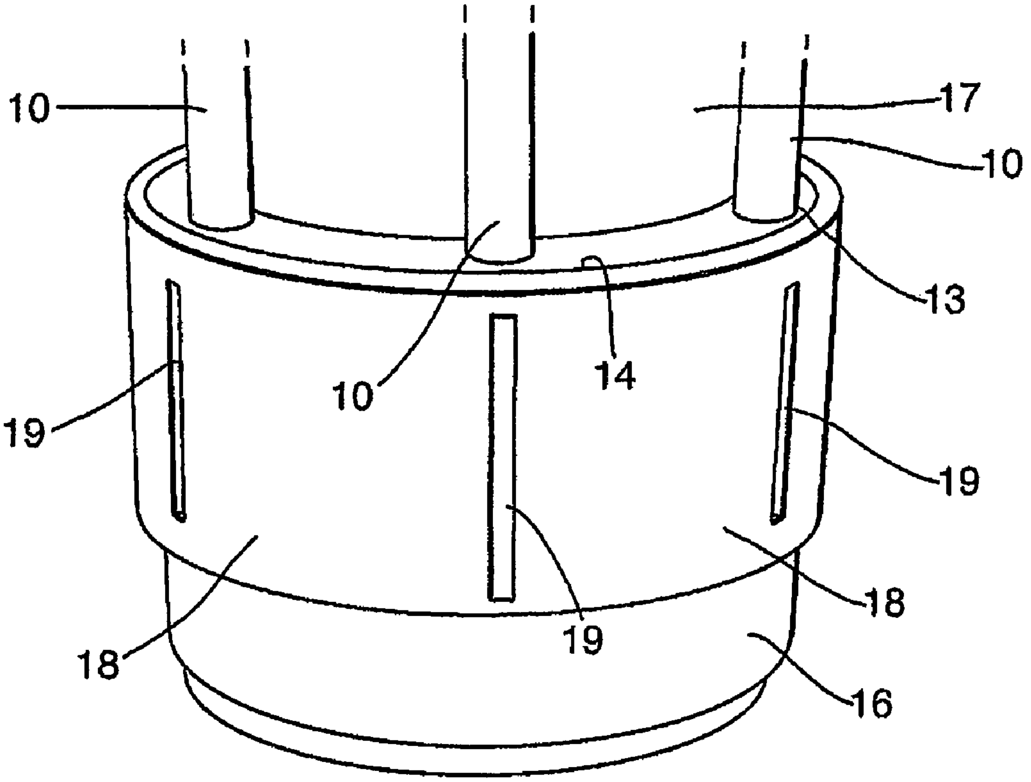
PRIOR ART Fig.3.
FIG. 3 is a perspective view of an end fitting, forming part of a surge arrester manufactured in accordance with a prior art method.
Figure 4:
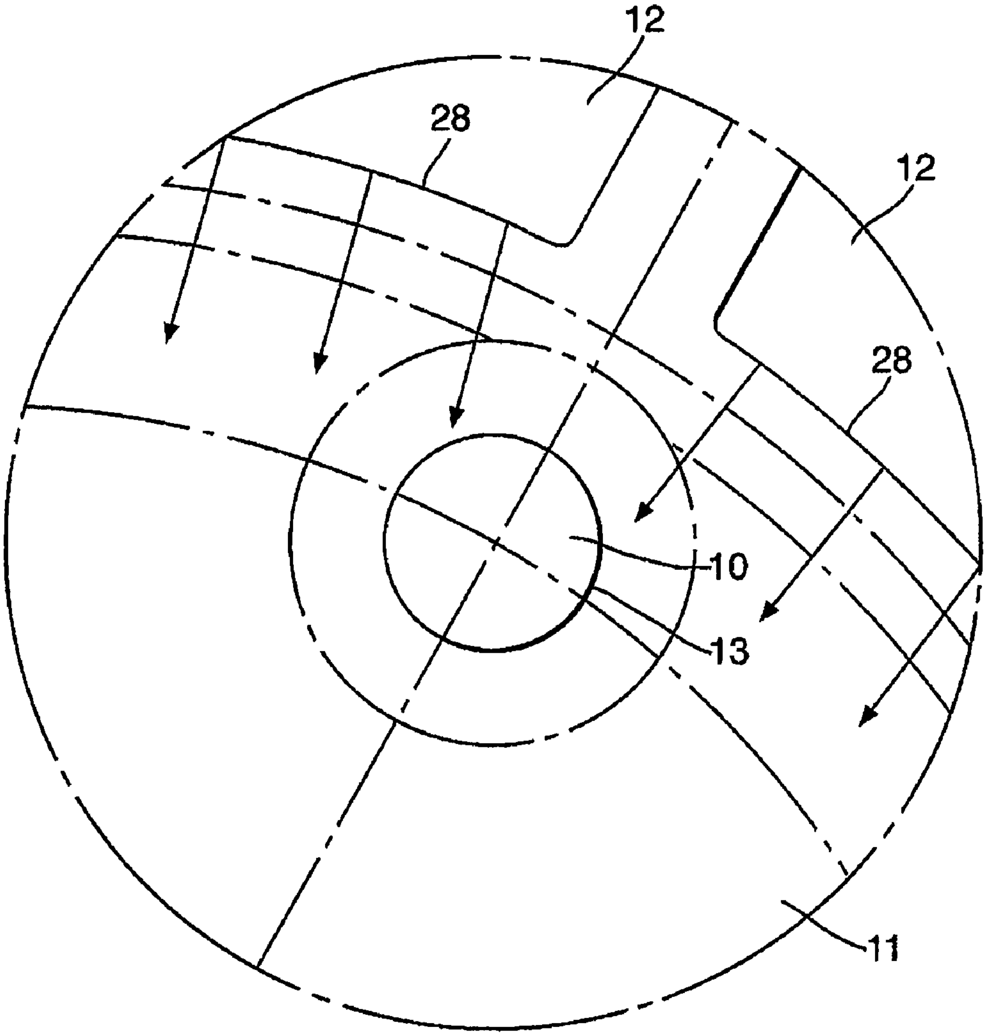
PRIOR ART Fig.4.
FIG. 4 is a schematic view of a crimp force profile resulting from a prior art off-center crimping technique.

A method of manufacturing a surge arrester incorporating the assemblies shown in FIGS. 7 and 8 in accordance with the invention includes inserting each of the load bearing rods 30, 30' (as appropriate) into the respective apertures 23, 23' of the two end fittings 21, 21' of the arrester. This is done such that a stack of varistor elements (such as the elements V of FIG. 2) is trapped, between the end fittings 21, 21' within the cage defined by the rods 30, 30'.

The stack of varistor elements includes one or more disc springs that tend to resist longitudinal compression of the surge arrester assembly. Thus, the next stage of the manufacturing process involves compressing the components of the surge arrester so as to compress the disc springs.

Thereafter, the method includes advancing a plurality of deformation tools relative to each of the apertures 23, 23' so as to deform the wall of the apertures 23, 23' into gripping engagement with the inserted load-bearing member 30, 30', according to the techniques described hereinabove.

Since at the time of such deformation the surge arrester is under longitudinal compression, on releasing of the compression force after the operation of the dies the disc springs place the rods 30, 30' into tension thereby creating a robust, rigid structure.

The method of the invention includes locating the deformation tools such that the deformation regions 31, 31' do not extend to be coterminous with the end faces 24, 24' of the end fittings 21, 21' from which the load-bearing members 30, 30' protrude.

Depending on the precise choice of method adopted, the deformation tools may optionally move simultaneously or sequentially (or in combinations of sequential and simultaneous movement with respect to groups of deformation tools or dies forming part thereof). The precise sequence of advancing of the deformation tools may be determined in dependence on the precise design of the end fitting 21, 21', the load-bearing member 30, 30' and end use of the crimped assembly 20, 20'.

Causing longitudinal movement of one or more of the deformation tools (for example, movement parallel to the load-bearing member 30, 30') may provide control over the degree of tension in each of the load-bearing members 30, 30' within the associated apertures 23, 23'. Such a step may also provide control over the contact pressure.

Apparatus for carrying out the method of the invention or for manufacturing the assemblies such as are shown in FIGS. 7 and 8 may take a variety of forms. In essence, such apparatus includes a clamping mechanism for securing a fitting such as the end fittings 21, 21' and, as desired, the stack of components making up, for example, a surge arrester and one or more deformation tools that are advanceable towards the end fitting 21, 21' secured in the jig and having inserted in the respective apertures 23, 23' thereof the respective load-bearing members 30, 30'. The deformation tool is capable of deforming the wall of the apertures 23, 23' such that the extent of deformation of the wall over a predetermined length thereof varies in dependence on the distance along the length from the adjacent load-bearing member 30, 30', in the way described herein.

The apparatus may include one or more controllers for controlling advancing of the deformation tools. Such controllers may, at the option of the apparatus designer, provide for simultaneous advancing, sequential advancing or combinations of simultaneous and sequential advancing.

Figure 9:
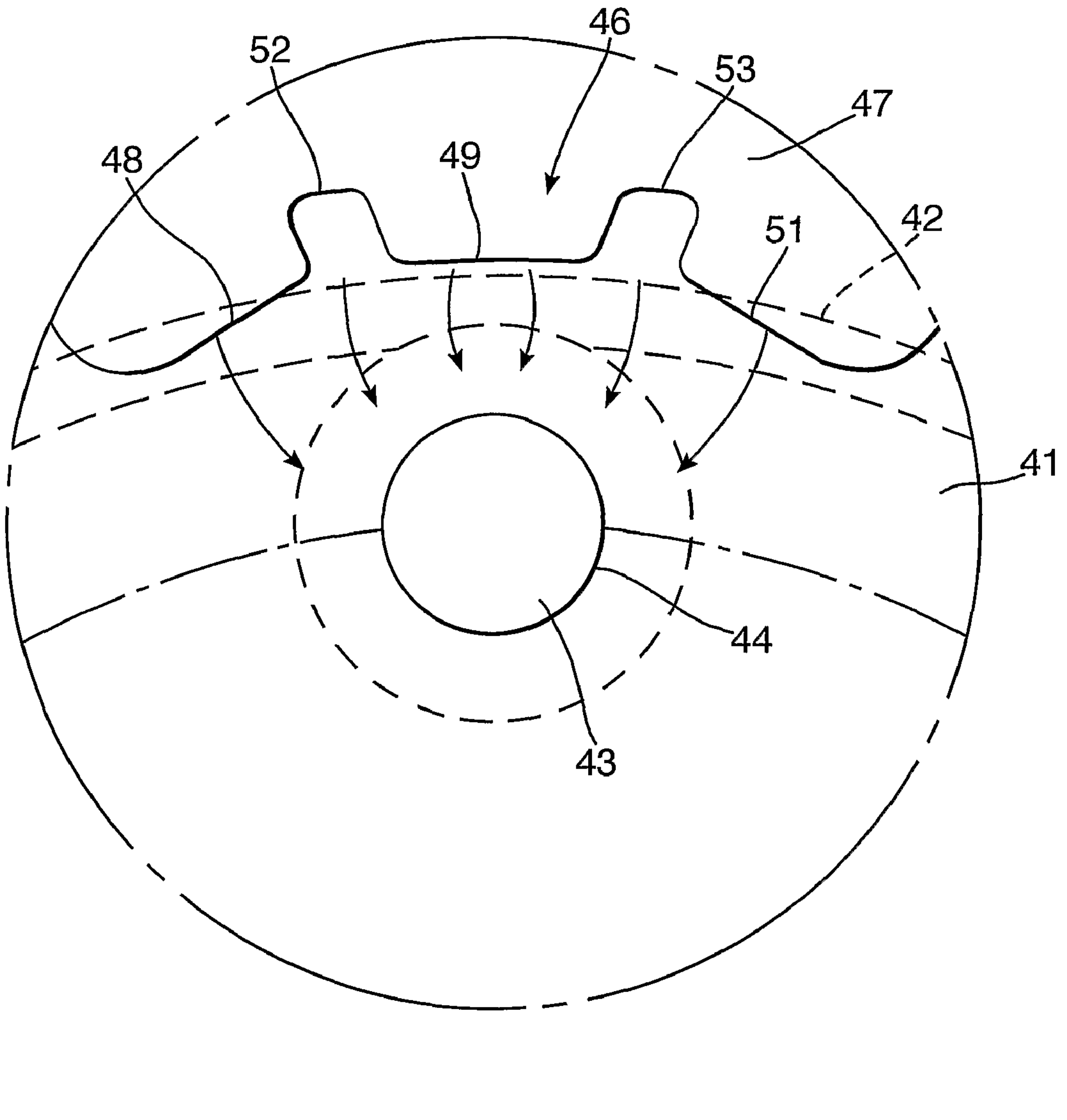
FIGS. 9, 10 and 11 are further views, that are similar to the FIG. 6 view, showing various end fittings and profiles of contact faces.
Figure 10:
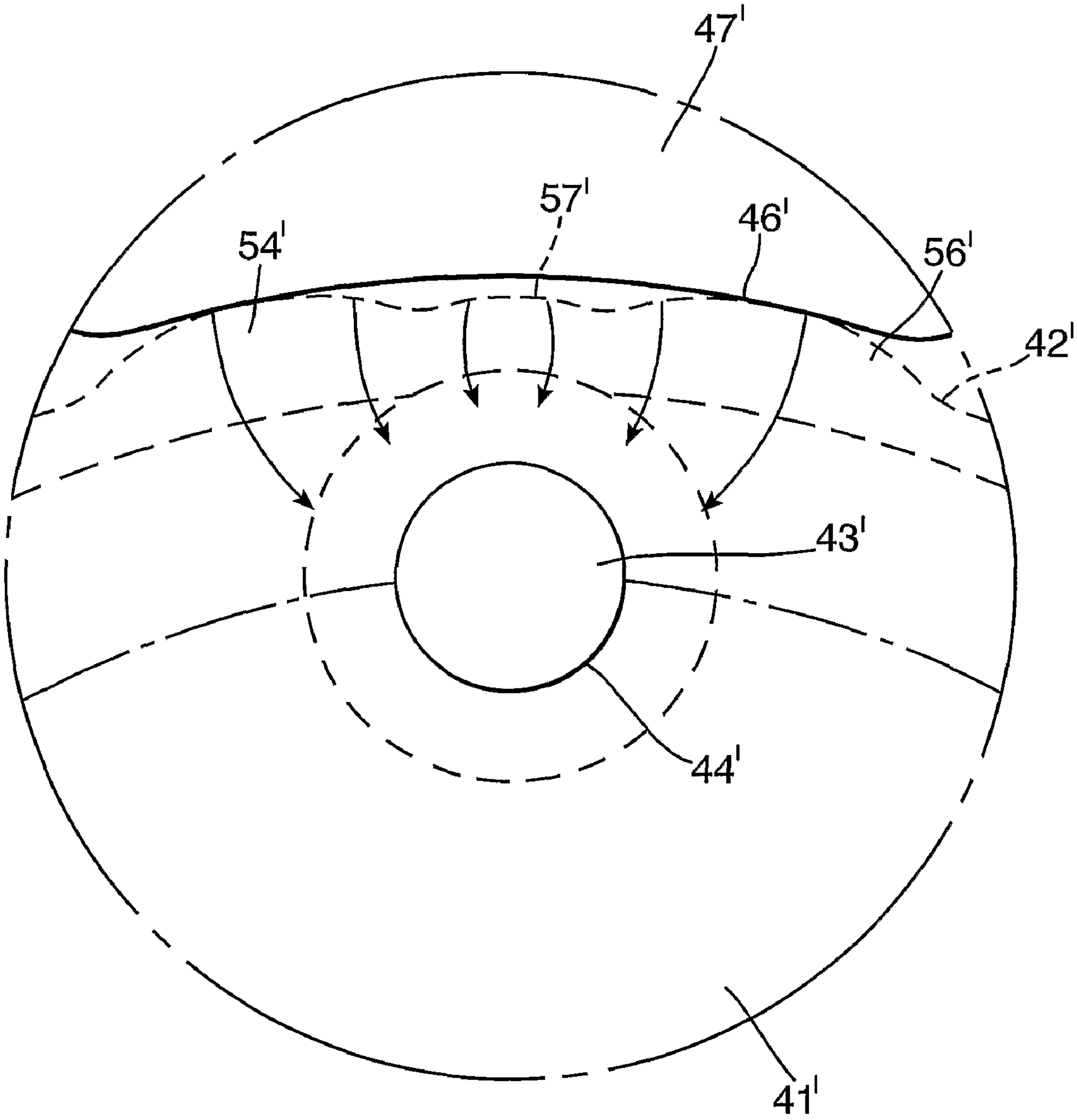
Figure 11:
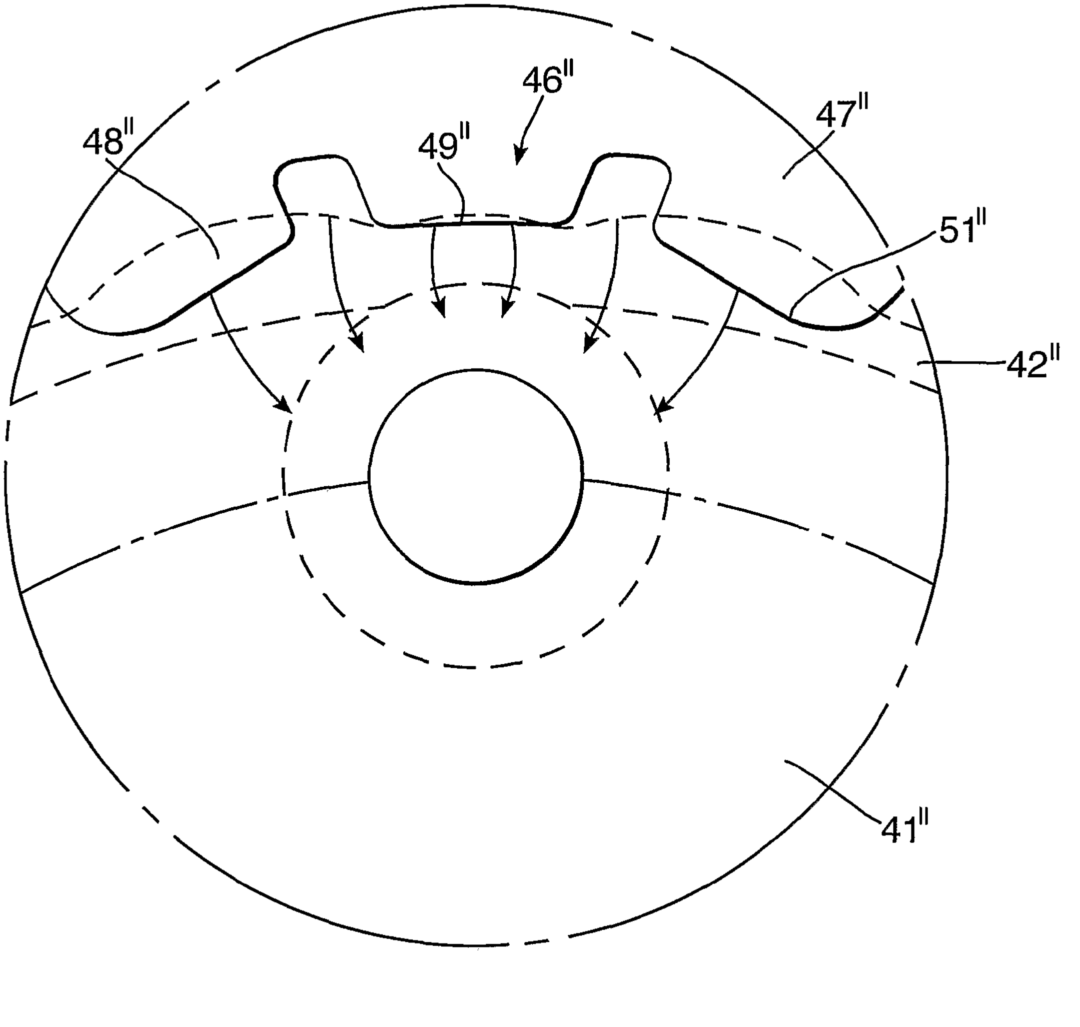

FIGS. 9, 10 and 11 show some variations on the contact face and end fitting cross-section arrangements that are possible within the scope of the invention. The arrangements of FIGS. 9 to 11 illustrate various ways of achieving or enhancing flow of the metal of the end fittings shown therein, so as to obtain the advantages of the invention.

In FIG. 9, end fitting 41 has a smooth arcuate outer periphery 42 in the vicinity of an inserted rod 43 and aperture 44.

A contact face 46 of die 47 includes three protuberances 48, 49, 51 that are spaced from one another by recesses 52, 53. The recesses 52, 53 in the embodiment shown extend parallel to the rod 43.

As signified by the arrows in FIG. 9, advancing of this design of the die 47 into the end fitting 41 results in a generally uniform crimp pressure acting around a major part of the circumference of the rod 43.

The FIG. 10 arrangement differs from the FIG. 9 arrangement in that the contact face 46' of the die 47' is a smooth arc that is free of pronounced protuberances and recesses.

Instead the periphery 42' of the end fitting 41' is formed with protuberances 54', 56' that are spaced from one another by an intermediate valley 57', as shown.

The protuberances 54', 56' provide reservoirs of metal in the end fitting 41' such that on advancing of the die 47' the reservoirs flow to cause the contact force pattern signified by the arrows in FIG. 10.

As a result of the presence of the reservoirs of metal represented by the protuberances 54', 56', the exterior of the end fitting 41' of FIG. 10 (and that of the end fitting 41" described below) may appear comparatively smooth following the deformation step. However, such an appearance would not in itself imply that the end fitting 41' had not undergone deformation in accordance with the invention.

FIG. 11 is a hybrid arrangement in which both the outer periphery 42" of the end fitting 41" and the contact face 46" of the die 47" have respective protuberances. Thus, the contact face 46" includes protuberances 48", 49", 51" separated by recesses 52", 53", and the outer periphery 42" includes the protuberances 54", 56" and the intermediate valley 57". This arrangement also results in a highly effective crimp force pattern, as signified by the arrows in FIG. 11.

What is claimed is:

1. A method of crimping a load-bearing member and an end fitting together, comprising:

providing an end-fitting having at least one aperture defined by a wall displaced from a center of a cross-section of the end fitting;

inserting a load-bearing member into the aperture in the end fitting;

advancing at least one deformation tool to non-uniformly deform a perimeter of the end fitting; and deforming the wall of the aperture into gripping engagement with the load-bearing member without exceeding a crimp threshold at which deformation to the load bearing member occurs;

wherein the non-uniform deformation of the perimeter of the end fitting over a predetermined length thereof varies in dependence on a distance of the perimeter from a diagonal mid-point of the at least one aperture along the predetermined length.

2. The method of claim 1, wherein the deformation of the perimeter of the end fitting over the predetermined length increases as the distance along the predetermined length from the load-bearing member increases.

3. The method of claim 1, wherein the load-bearing member is arranged at a corner of the end fitting.

4. The method of claim 1, wherein the deformation tool includes a contact face that contacts the end fitting, the contact face being profiled relative to the end fitting to produce the non-uniform deformation.

5. The method of claim 4, wherein the contact face includes at least one protuberance that protrudes relative to a further portion thereof that causes the non-uniform deformation.

6. The method of claim 5, wherein the contact face includes at least two protuberances separated from one another by at least one recess.

7. The method of claim 1, wherein the wall of the aperture includes one or more protuberances in a region contacted by the contact face.

8. The method of claim 1, wherein the load-bearing member partly protrudes from the end fitting.

9. The method of claim 1, wherein the perimeter of the end fitting is non-uniformly deformed a distance from any face of the end fitting into which the load-bearing member is inserted.

10. The method of claim 1, wherein a plurality of the deformation tools are advanced simultaneously.

11. The method of claim 1, wherein a plurality of the deformation tools are advanced sequentially.

12. The method of claim 1, further comprising moving the deformation tool longitudinally relative to the load-bearing member while deforming the wall.

13. A method of crimping a load-bearing member and an end fitting together, comprising:

providing an end-fitting having at least one aperture defined by a wall displaced from a center of a cross-section of the end fitting;

providing an annular array of deformation tools;

inserting a load-bearing member into the aperture in the end fitting;

advancing the annular array of deformation tools to non-uniformly and independently deform a perimeter of the end fitting depending on a distance of the perimeter from a diagonal mid-point of the at least one aperture; and deforming the wall of the aperture into gripping engagement with the load-bearing member without exceeding a crimp threshold at which deformation to the load bearing member occurs.

14. The method of claim 13, wherein the deformation tools include a combination of side deforming dies and a corner deforming dies.

15. The method of claim 14, wherein the corner deforming die include a contact face that contacts the end fitting, the contact face being profiled relative to the end fitting to produce the non-uniform deformation.

16. The method of claim 15, wherein the corner deforming die include at least one protuberance that protrudes relative to a further portion thereof that causes the non-uniform deformation.

17. The method of claim 16, wherein the side deforming die include a contact face that contacts the end fitting, the contact face being profiled relative to the end fitting to produce the non-uniform deformation.

18. The method of claim 17, wherein the side deforming die include at least one protuberance that protrudes relative to a further portion thereof that causes the non-uniform deformation.

19. The method of claim 1, wherein the at least one deformation tool is an annular array of deformation tools in the form of side-deforming dies and corner-deforming dies that are moveable in order to crimp the load-bearing member.

20. The method of claim 18, wherein the at least one deformation tool is an annular array of deformation tools in the form of side-deforming dies and corner-deforming dies that are moveable in order to crimp the load-bearing member.

21. The method of claim 20, further comprising the step of:

advancing the annular array of deformation tools simultaneously to the aperture so as to deform the wall of the aperture into gripping engagement with the load-bearing member.

22. The method of claim 20, further comprising the step of:

advancing the annular array of deformation tools sequentially to the aperture so as to deform the wall of the aperture into gripping engagement with the load-bearing member.

23. The method of claim 22, wherein the sequence of advancing the annular array of deformation tools is dependent on the precise design of the end fitting and the load-bearing member.

24. The method of claim 1, further comprising the step of:

using one or more controllers for controlling the advancing of the annular array of deformation tools.

25. A method of crimping a load-bearing member and an end fitting together, comprising:

providing an end-fitting having at least one aperture defined by a wall displaced from a center of a cross-section of the end fitting;

inserting a load-bearing member into the aperture in the end fitting;

advancing at least one deformation tool to non-uniformly deform a perimeter of the end fitting; and deforming the wall of the at least one aperture into gripping engagement with the load-bearing member resulting in undeformed bands and adjacent deformation of the perimeter of the end fitting over a predetermined length thereof that varies in dependence on a distance along the predetermined length from the a diagonal mid-point of the at least one aperture.

26. The method of claim 25, wherein the deformation of the perimeter of the end fitting over the predetermined length increases as the distance along the predetermined length from the load-bearing member increases.

27. The method of claim 25 wherein the load-bearing member is arranged at a corner of the end fitting.

28. The method of claim 25, wherein the deformation tool includes a contact face that contacts the end fitting, the contact face being profiled relative to the end fitting to produce the non-uniform deformation.

29. The method of claim 28, wherein the contact face includes at least one protuberance that protrudes relative to a further portion thereof that causes the non-uniform deformation.

30. The method of claim 28, wherein the contact face includes at least two protuberances separated from one another by at least one recess.

31. The method of claim 25, wherein the wall of the aperture includes one or more protuberances in a region contacted by the contact face.

32. The method of claim 25, wherein the load-bearing member partly protrudes from the end fitting.

33. The method of claim 25, wherein the perimeter of the end fitting is non-uniformly deformed a distance from any face of the end fitting into which the load-bearing member is inserted.

34. The method of claim 25, wherein a plurality of the deformation tools are advanced simultaneously.

35. The method of claim 25, wherein a plurality of the deformation tools are advanced sequentially.

36. The method of claim 25, further comprising moving the deformation tool longitudinally relative to the load-bearing member while deforming the wall.

* * * * *